United States Patent [19]
Reid

[11] Patent Number: 5,133,294
[45] Date of Patent: Jul. 28, 1992

[54] PET CARRIER FOR VEHICLES

[76] Inventor: Katherine L. Reid, 106 Ravenhead, Houston, Tex. 77034

[21] Appl. No.: 755,698

[22] Filed: Sep. 6, 1991

[51] Int. Cl.$^5$ ............................................. A01K 29/00
[52] U.S. Cl. ..................................................... 119/96
[58] Field of Search ................... 119/96; 297/250, 188, 297/255, 256, 328; 5/118

[56] References Cited

U.S. PATENT DOCUMENTS

| | | | |
|---|---|---|---|
| 815,046 | 3/1906 | Sherman | 297/188 |
| 1,656,352 | 1/1928 | Groll | 297/256 |
| 1,739,366 | 12/1929 | Lane | 297/250 |
| 2,869,146 | 1/1959 | Allison | 5/118 |
| 3,206,775 | 9/1965 | Filson | 5/118 |
| 3,290,086 | 12/1966 | Petrak | 5/118 X |
| 3,340,547 | 9/1967 | Welti | 5/118 |
| 3,436,770 | 4/1969 | Turner | 5/118 X |
| 4,512,286 | 4/1985 | Rux | 119/96 |
| 4,597,359 | 7/1986 | Moorman | 119/96 |
| 4,860,689 | 8/1989 | Stewart | 119/28.5 |
| 4,969,683 | 11/1990 | Wallace et al. | 297/218 |
| 5,005,526 | 4/1991 | Parker | 119/96 |

FOREIGN PATENT DOCUMENTS 413807  7/1934  United Kingdom ............... 119/28.5

*Primary Examiner*—Gene Mancene
*Assistant Examiner*—Thomas Price
*Attorney, Agent, or Firm*—Browning, Bushman, Anderson & Brookhart

[57] ABSTRACT

A pet carrier for use in a vehicle comprises a platform sized to generally fit on a passenger seat of the vehicle. Front, rear and side panels are pivotally connected to the platform for movement between generally horizontal positions and upright positions wherein they form a pet enclosure upstanding from the platform. The rear panel, in its upright position, is much taller than the other panels, and is inclined upwardly and rearwardly to generally match the inclination of the back of the passenger seat. Connectors are provided for releasably retaining the panels in their upright positions. The front and rear panels, in their horizontal positions, overlie the platform, and can be releasably retained in such overlying relation, for convenient carrying and storage. Supports are provided for selective adjustment to the angle of the passenger seat.

23 Claims, 3 Drawing Sheets

PET CARRIER FOR VEHICLES

BACKGROUND OF THE INVENTION

Owners of pets, particularly cats and dogs are well aware of the various problems involved when those pets are transported in a vehicle, particularly the owner's passenger car. The animals tend to wander about the vehicle, sometimes even cavorting, and thereby distracting the driver. Dogs, in particular, seem to find it almost irresistible to look through the car window. Therefore, they will get up on the seat of the car, and in many instances, a small or medium size dog will put its paws up on the back of the seat or the window sill to get a better view. The animals claws then damage the upholstery of the car seat and its back. On the other hand, the pets often rebel against being confined in a cage-like carrier or kennel. It is very difficult to get the pet into the kennel, and even when this is accomplished, the pet often protests in such a noisy manner that the drive can be extremely unpleasant.

A number of devices have been suggested for providing more or less open structures for holding pets in vehicles or elsewhere. In general, these devices do not adequately address all the above problems and/or do not comport with modern ideas concerning safety. For example, U.S. Pat. No. 2,869,146 to Allison provides a platform which can be mounted on the back of a car seat so that it juts outwardly from the upper end of the seat back. This certainly provides a surface on which a pet can sit high in the car and look through the window without being supported directly on the upholstery or other interior finishings of the car. However, this device places the pet much too high for the pet's own safety and for proper visibility for the driver. Furthermore, it is a completely open platform from which the pet could easily fall, either hurting itself, or again, distracting or injuring the driver. Because of its very high position in the car, the platform would appear to be practical only for very small dogs. Furthermore, the support on which the platform rests is awkward and space consuming for purposes of transportation and storage.

U.S. Pat. No. 4,969,683 to Wallace et al discloses a cushion-like protector for a car seat. However, this is essentially a covering only. It does not in any way confine the pet, either physically or psychologically, nor does it provide any substantial increase in the height at which the pet can sit. Furthermore, since the lower horizontal cushion simply rests on and follows the angle of the car seat, it positions the pet at a like angle, which may be uncomfortable, unstable for footing and may contribute to the tendency of the pet to fidget and move about in the car.

U.S. Pat. Nos. 5,005,526 and 4,597,359 disclose devices which do actively restrain the animal, and one of which also sits the animal up somewhat higher, so that it can see out the window, but not as high as the platform of the above-mentioned U.S. Pat. No. 2,869,146. However, because these devices are so very restraining, they can involve much the same problems as a kennel or cage-type carrier in terms of getting the dog properly strapped in and causing the dog to sit quietly once it is strapped in.

SUMMARY OF THE INVENTION

The present invention is directed to a pet carrier which provides a platform sized to generally fit on a passenger seat of a vehicle. Front, rear and opposite side panels are pivotally connected to the platform, preferably along front, rear and lateral edges, respectively, of the platform. The panels are moveable on their pivotal connections from generally horizontal positions to generally upright positions. In these upright positions, peripheral portions of the panels lie adjacent one another so that, together, the upright panels form a pet enclosure. The rear panel, in its upright position, is inclined upwardly and rearwardly to generally match the inclination of a passenger seat back and has a substantial height, so that it generally covers and protects a substantial part of the seat back. Then, even if the animal does rear up, using its front paws for support, those paws can be supported by the rear panel, rather than seat back. The other panels, in their upright positions, are not nearly so tall as the rear panel. They form a sufficient enclosure to help prevent the pet from falling off the seat due to normal movements of the vehicle, and to psychologically restrain the animal, but while still making it easy for the animal to get on or off the carrier when entering or leaving the car, and also without obstructing the animal's view or making the animal feel so severely confined that it resists entering or staying in the carrier. First retaining means associated with the panels releasably retain the panels in their upright positions.

If the panels are connected to the platform adjacent its edges, as is preferred, it is also preferable that, in their upright positions, at least the side panels extend a short distance downwardly from the platform to form base legs. This, along with the rigidity of the platform, raises the animal up high enough so that most animals can see through the window without rearing up, and thus will not be tempted to do so.

It is also preferred that support members be carried by the side panels in an adjustable manner so that lower surfaces thereof can be made to extend downwardly beyond the side panels, and at any one of a number of angles with respect to the platform. The angle is selected to generally match that of the seat on which the device will rest. Since almost all car seats do have some such angle, this not only serves to keep the platform level, and therefore safer and more comfortable for the pet, but also further serves to raise the platform, so that the animal can see through the window without rearing up.

When the first retaining means are released, and the panels are folded into their generally horizontal positions, there is formed a compact unit for convenient transportation and/or storage. Preferably, the front and rear panels are folded inwardly, so that they overlie the platform, and those of their edges which were uppermost in their upright positions meet above the platform. Second connector means are preferably provided for securing the front and rear panels releasably in this folded position. The side panels, which like the front panel are much shorter than the rear panel, fold outwardly to their horizontal position, so that those edges which were uppermost in the upright position protrude laterally away from the platform. Because of their relatively small size, this protrusion does not substantially increase the lateral dimension of the folded unit. Preferably, the lower portions then underlie the platform and prevent the protruding (formerly upper) portions from flopping downwardly.

The platform and one of the front or rear panels preferably have hand grip openings which register when the panels are in their horizontal position to facilitate carrying of the folded unit. Preferably, the front panel contains the hand grip hole, and meets the platform at its lower edge. Thus, when horizontal, there is no lower portion jutting out whereby the hand grip hole is spaced a comfortable distance from the periphery of the folded unit. The rear panel may have a lower portion, like the side panels, to form a further base leg.

The support members may be conveniently formed of additional panels mounted parallel to and along the outer sides of the side panels. Each may be pivoted to its respective side panel at its front end, and attachable at its rear end in any one of a number of angular positions about the pivotal connection.

At least the platform and the inner sides of those portions of the panels which form the pet enclosure are made of or covered by a material which is easy to clean and durable, and preferably also comfortable for the pet, such as indoor/outdoor carpeting. In addition, those surfaces which contact the car seat should not be sharp or rough. It is therefore desirable to make or cover the entire surface with such material. The enclosure can also help to retain a cushion or the like for the further comfort of the pet, and also for further ease in cleaning.

The inventor's personal trials of the device with her pet dog proved that, somewhat surprisingly, the dog willingly enters the carrier and remains quietly on it during automobile rides, and is not inclined either to rear up or move about the car. However, if it is desired to physically restrain the pet, and if the rear panel, like the side panel, has a lower portion extending below the platform, a conventional leash can be easily interfaced with the device. Alternatively, since the device can be held in place on the car seat by the passenger seat belt, that belt, thus overlying the device, can also pass through a conventional restraint harness intended for such seat belt engagement.

Additional features and advantages of the invention, as well as various objects thereof, will be made further apparent by the following detailed description, the drawings, and the claims.

DETAILED DESCRIPTION

Figure 1:
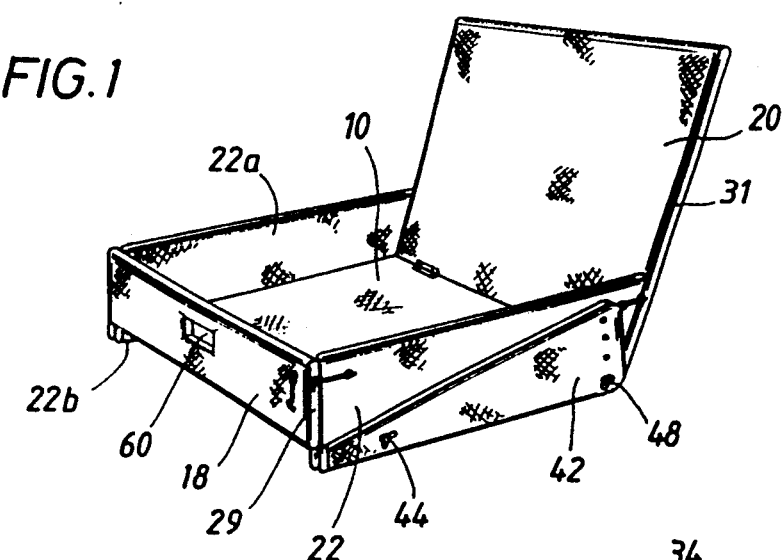
FIG. 1 is a perspective view of a pet carrier according to the invention assembled for use.
Figure 2:
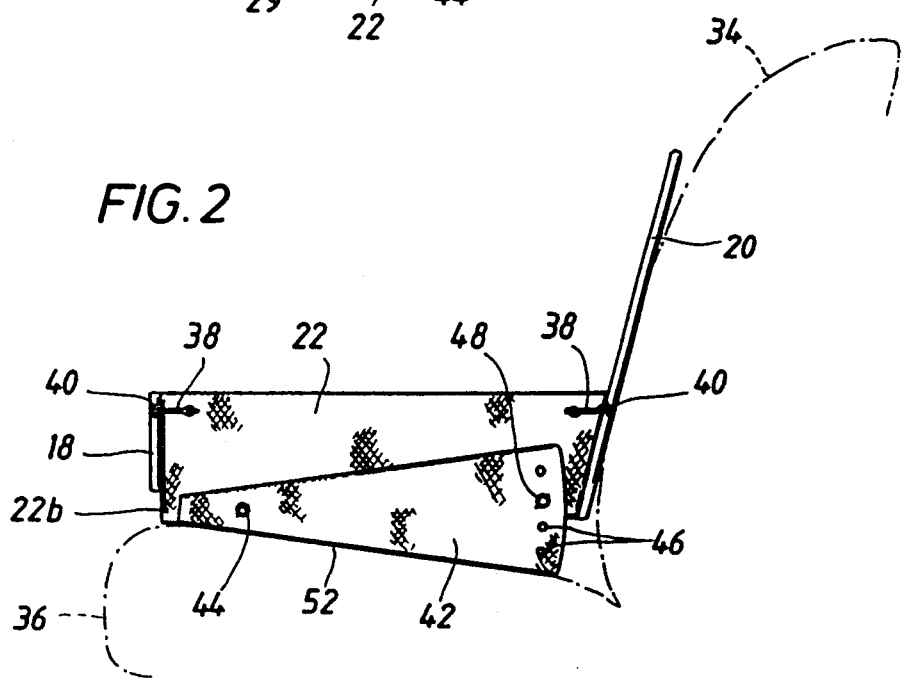
FIG. 2 is a side view of the carrier, with the support members in a different position from that of FIG. 1.
Figure 3:
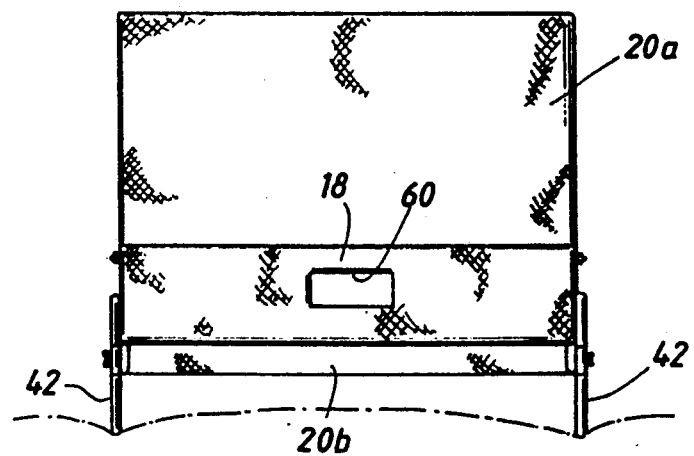
FIG. 3 is a front view of the carrier in the configuration of FIG. 2.
Figure 4:
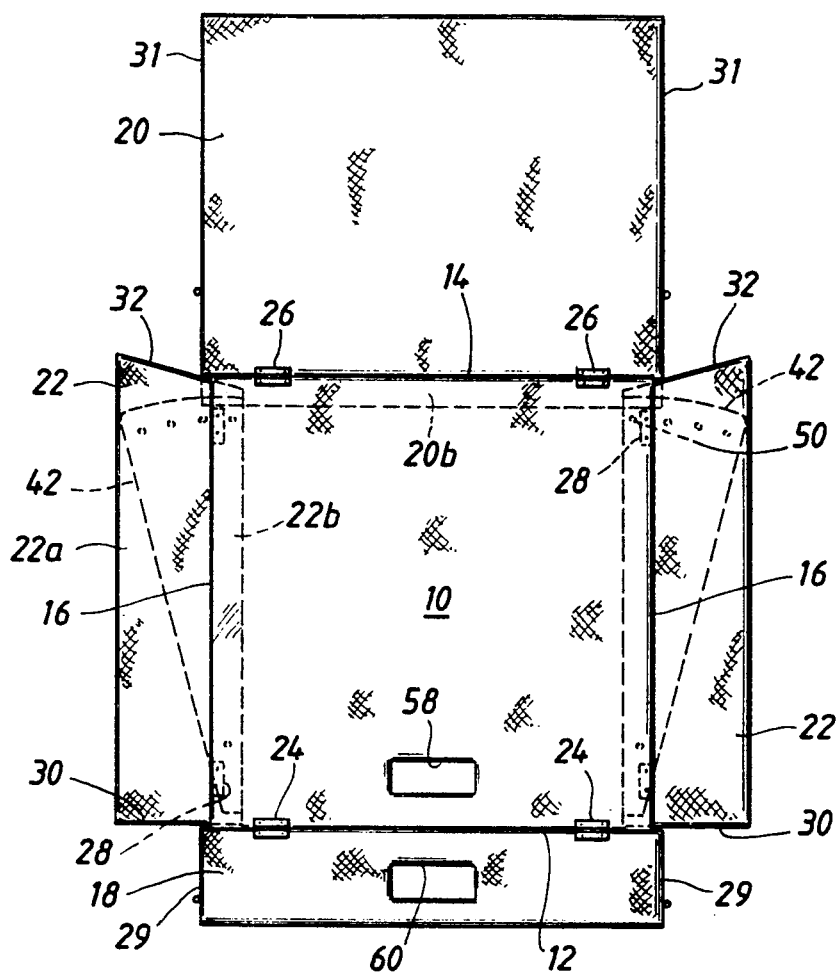
FIG. 4 is a top plan view of the carrier with all panels collapsed outwardly.

Referring now to the drawings, and particularly to FIG. 4, the pet carrier comprises a flat-surfaced rectangular platform 10 having a front edge 12, a rear edge 14, and opposite side edges 16. Pivotally connected to the platform 10 adjacent its respective edges 12, 14 and 16, are a front panel 18, a rear panel 20 and two side panels 22. The front 18 and rear 20 panels are so connected by respective hinges 24 and 26 on the upper surface of platform 10, and side panels 22 are so connected by hinges 28 disposed on the underside of platform 10. These hinges 24, 26 and 28 permit the panels 18, 20 and 22 to pivot to generally upright positions, as shown in FIGS. 1–3, so that their lateral edges 29, 30, 31 and 32, i.e. those of their edges which are disposed angularly with respect to the respective adjacent edges 12, 14 and 16 of platform 10, are disposed adjacent one another whereby the panels form an enclosure, as best seen in FIG. 1. In the preferred embodiment shown, the panels, in their generally upright positions, actually meet or abut, although in less preferred embodiments, there could be slight spaces between them.

The front and rear panels 18 and 20 are rectangular, and slightly wider than the platform 10, so that, in the upright position shown in FIGS. 1–3, they overlie the adjacent lateral edges 30 and 32 of side panels 22. Front panel 18 is pivotally connected to the platform 10 at its lower edge.

The side panels 22, on the other hand, are not pivotally connected at their edges, but rather, generally along pivot lines intermediate their extremities. In this regard, "lines" is not used in a strict mathematical sense, but simply designates the long narrow zone of each panel 22 which generally faces the respective platform edge 16 when the panel 22 is in its upright position. These pivot lines are situated such that, when the panel 22 is in its upright position, a relatively large upper portion 22a thereof extends above the platform 10 to partially form the enclosure, while a relatively smaller portion 22b thereof extends downwardly from platform 10 to form a base leg which can rest on the seat of an automobile.

Figure 5:
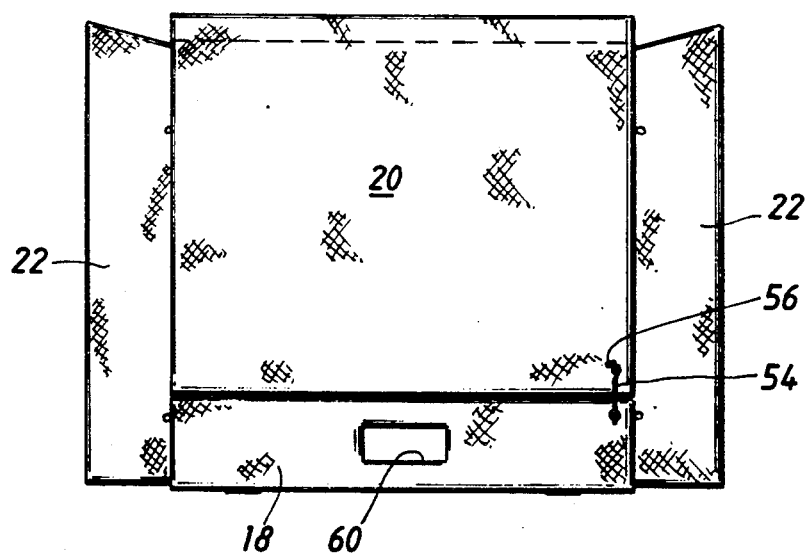
FIG. 5 is a top plan view of the carrier folded into transport/storage configuration.

When the panels 22 are laid out in their horizontal positions, as shown in FIGS. 4–5, the upper portions 22a extend laterally outwardly away from the platform 10, while the lower portions 22b generally underlie the platform 10. It is noted that terms such as "upper," "lower," "underlie," etc. are used for convenience, with reference to the device as positioned for ordinary use, i.e. as shown in FIGS. 1–3, and should not be construed in a limiting sense. In particularly, it will be apparent that the orientation will change when the device is lifted for carrying and/or storage.

Returning to the description of the side panels 22, it is further noted that while their forward lateral edges 30 extend straight perpendicular to the adjacent edges 16 of platform 10, their rear lateral edges 32 are inclined outwardly from their pivot lines to the free edges of their upper portions 22a. As previously mentioned, the rear panel 20, in upright position, overlies and abuts edges 32. Thus, edges 32 and the abutting face of panel 20 serve as indexing surfaces to set rear panel 20 at an upward and rearward angle, generally corresponding to that of the back 34 of a car seat 36, as shown in FIG. 2.

In order to releasably retain the panels 18, 20 and 22 in their upright positions, connectors first retaining means in the form of are provided. More specifically, hooks 38 carried on the outer faces of side panels 22 are engageable in eyelets 40, on the adjacent lateral edges 29 and 31 of the front 18 and rear 20 panels. However, it will be appreciated that many other forms of connectors could be employed.

Rear panel 20, like side panels 22, meets the platform 10 along a pivot line. It has an upper portion 20a and a lower portion 20b, the latter being aligned with portions 22b to form a further base leg.

Referring to FIG. 2, it can be seen that the rear panel 20 has a substantial height, adequate to cover and protect a significant portion of the seat back 34. This height is preferably chosen so that a small to medium size dog can place its front paws on the upper edge of rear panel 20, comfortably, and achieve sufficient elevation of its head thereby, so that the dog is then less likely to use the seat back 34 itself for support.

As previously mentioned, the lower portions 22b of side panels 22 and 20b of rear panel 20 can serve as base legs to elevate the platform 10 somewhat from the surface on which it is resting. In the embodiment shown, the lower edges of these legs 20b and 22b are made parallel with the platform 10, so that the device can rest properly on a level surface. In some instances, a vehicular surface, e.g. in the back of a station wagon, van, or hatchback-type car, may be level. It is also possible that the device might be used other than in a vehicle. For example, the owner may carry the pet in a vehicle to some else's home, and may then wish to take the device into the other person's home to provide a place for the pet to rest and discourage it from wandering about the other person's home.

However, it is anticipated that the device can, and often would, be used on an ordinary passenger seat, such as illustrated at 36, and such seats are almost always inclined downwardly from their front to their rear extremities, as shown. Therefore, to make the device adaptable for such seats, in a way that maintains the platform 10 in a generally level position, adjustable supports are provided. In the embodiment shown, the supports are in the form of a pair of wing panels 42, each of which lies against the outer face of a respective one of the side panels 22. Each wing panel 42 is generally sector shaped. Its narrower end is disposed forwardmost and is pivotally connected to the respective side panel 22 by a pin 44, in a well known manner. Adjacent its wider or rear end, there are a number of holes 46 circumferentially spaced at an equal radius from the pivot pin 44. The respective side panel 22 has a hole 50 positioned so that, as wing panel 42 is rotated about pin 44, various ones of the holes 46 can be aligned with the hole 50. A simple connector, such as a bolt and wing nut, diagrammatically indicated at 48, can be placed through the two aligned holes 46 and 50 to releasably secure the wing panel 42 in a given angular position, about pivot 44, so that its lower edge 52 generally matches the inclination of the seat 36. The lowermost of the holes 46 is positioned so that, when the connector 48 is engaged therewith, wing panel 42 will lie entirely within the perimeter of panel 22, as shown in FIG. 1. Thus, when it is desired to allow the device to rest on the level base legs 20b and 22b, the wing panels 42 need not be completely detached from the device, and there is less chance that they will be lost, and less inconvenience in re-attaching them when their use is desired.

At least the interior surfaces of the pet enclosure, i.e. the upper face of platform 10 and the inner faces of the enclosure forming portions of panels 18, 20 and 22, are formed of or covered with a comfortable, easy-care material. In the illustrated embodiment, rigid infrastructures are completely covered by padded vinyl, indoor-outdoor carpeting, or the like. The enclosure formed by the panels can also serve to retain a cushion for the additional comfort of the pet.

The height of the front 18 and side 22 panels, in their upright positions, is substantially less than that of rear panel 20. They serve as a partial restraint, both physical and psychological, for the pet. It provides a certain amount of restraint, for safety sake; it retains the pet's cushion, and it gives the pet a secure, enclosed, bed-like environment, which psychologically inhibits the pet from wandering about the car. However, it is not so restraining as to make it difficult to get the pet into and out of the carrier, nor make the pet unwilling to do so.

FIG. 4 shows the device with all panels opened outwardly with respect to platform 10. From this position, to assemble the device for use, two adjacent panels, e.g. front panel 18 and one of the side panels 22, are raised to their upright positions and connected together by one of the hooks 38 and mating eyelet 40. The other of the side panels may then be raised and connected to the front panel by another of the hooks and eyelets. Finally, the rear panel 22 is raised until it abuts the indexing surfaces 32, and is then connected to side panels 22 by the other hooks 38 and eyelets 40. Wing panels 42 may be adjusted, if necessary, in the manner described above.

Figure 6:
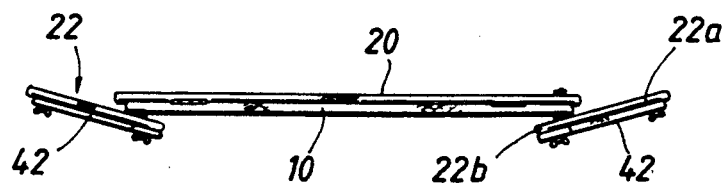
FIG. 6 is a front view of the carrier in the configuration of FIG. 5.

When it is desired to fold the device into a compact configuration for transportation or storage, all hooks 38 are released, and the panels may be allowed to collapse outwardly to the configuration of FIG. 4. Then, with side panels 22 being out of the way, the front 18 and rear 20 panels can be pivoted all the way in until they overlie platform 10, as shown in FIG. 5. Panels 20 and 18 are sized so that their free edges meet in this folded configuration. They can then be secured to each other, to retain them in overlying relation to the platform 10, by a second retaining means or connector in the form of a hook 54 carried on one of the panels, e.g. front panel 18, and an eyelet 56 carried on the other, although many other forms of connectors could be employed. It is noted that, in this folded configuration, the lower portions 22b of side panels 22 underlie platform 10 and engage an underside thereof, thereby preventing the side panels 22 from flopping into a downwardly depending position (see FIG. 6). It is also noted that the platform 10 and front panel 18 have hand grip holds 58 and 60 which are aligned when the device is in the folded configuration of FIGS. 5 and 6 so that the user can easily grip the device to carry it. Because front panel 18 has no lower portion (which would jut out when folded as in FIGS. 5 and 6), but rather is hinged at its lower edge, the user can easily grip the holes 58 and 60.

Figure 7:
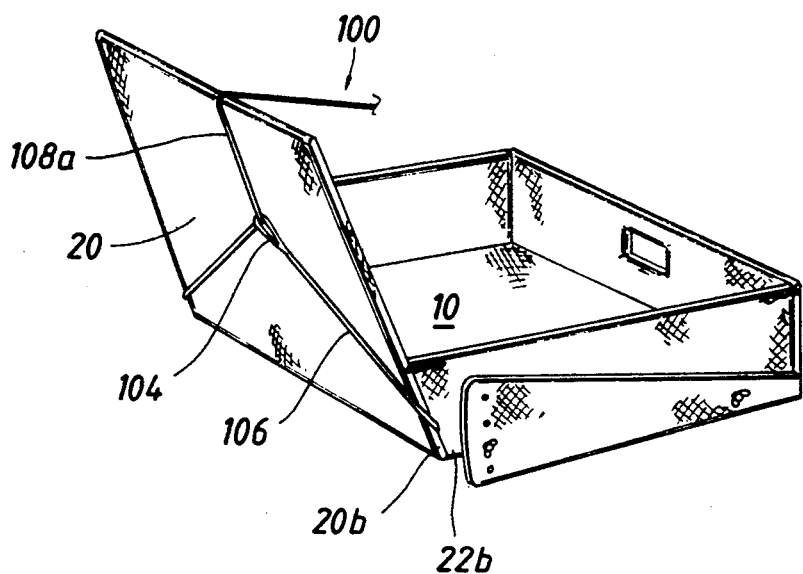
FIG. 7 is a perspective view showing how a conventional leash may be engaged with the device.
Figure 8:
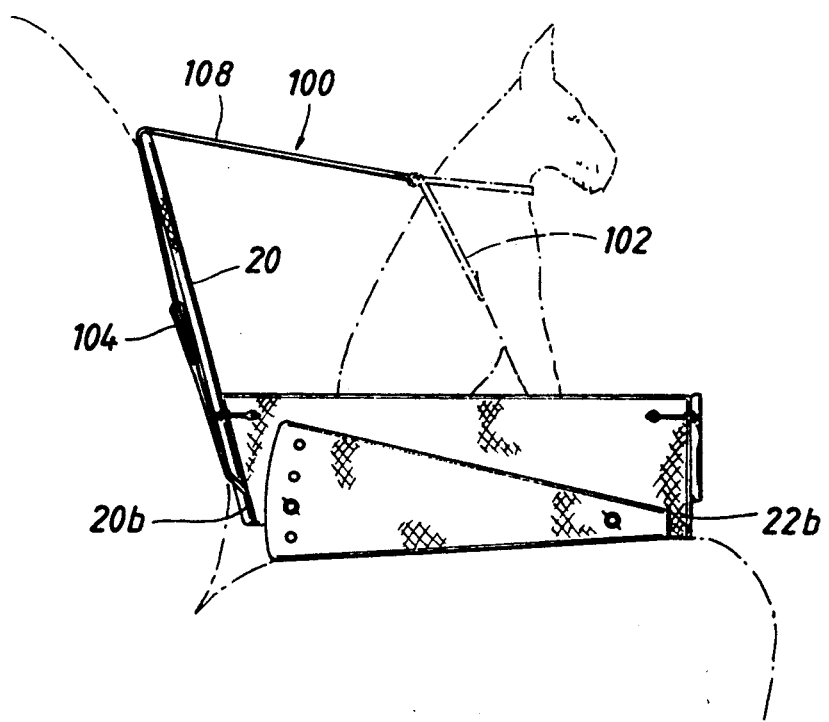
FIG. 8 is a side view of the arrangement of FIG. 7.

On the other hand, because rear panel 20 does have a depending lower portion 20b, that portion 20b can engage a leash 100 as shown in FIGS. 7 and 8 to provide positive physical restraint, if desired, without the oppressive confinement of a kennel or the like. The harness 102 at one end of the leash 100 is passed through the hand loop 104 at the other end to form a contractible noose 106 of the length 108 of leash interconnecting harness 102 and loop 104. Noose 106 is passed under lower portion 20b of rear panel 20, from the back side, and harness 102 is pulled up to tighten the noose 106 and draw it tightly between panel portions 20b and 22b, upward movement being arrested by platform 10 adjacent the upper extremity of portion 20b. This leaves part 108a of the length 108 of the leash extending away from noose 106 and loop 104 to the harness 102. This part 108a can pass over the upper edge of panel 20 into the enclosure, and may then be engaged with the pet. With a six foot leash, and a carrier sized approximately as shown with respect to the car seat, this allows the pet reasonable play, while confining it to the enclosure of the carrier.

A standard car seat belt may be passed between upper portions 20a and 22a and over platforms 10 to hold the carrier on the car seat. Available pet restraint harnesses, adapted to engage a car seat belt, may so engage a seat belt thus overlying platform 10, as an alternative physical restraint measure.

Many modifications of the exemplary embodiment shown in the drawings are possible. For example, other forms of angularly adjustable supports may also be used. For example, instead of wing panels lying parallel to and against the side panels 22, a single support panel, underlying the platform 10 and arranged generally horizontally, could be employed, along with a suitable means for varying the distance of its rear edge from that of the platform 10. Various other modifications will suggest themselves to those of skill in the art. Accordingly, it is intended that the present invention be limited only by the claims which follow.

What is claimed is:

1. A pet carrier for use in a vehicle, comprising:
a platform sized to generally fit on a passenger seat of such vehicle;
a front panel, a rear panel, and two opposite side panels, each respectively pivotally connected to the platform for movement between a generally horizontal position and an upright position, the panels, in their upright positions, having peripheral portions which lie adjacent one another so that the upright panels form a pet enclosure, the rear panel, in its upright position, being inclined upwardly and rearwardly to generally match the inclination of the back of such passenger seat, and the others of the panels, in their upright positions, having heights substantially less than that of the rear panel; and
first retaining means associated with the panels for releasably retaining the panels in their upright positions.

2. The device of claim 1 wherein said first retaining means comprises first connectors for connecting the panels to one another.

3. The device of claim 1 further comprising at least one support interconnected with the platform, having a lower support surface, and adjustably mounted to vary the angle between the support surface and platform to approximate the angle of such passenger seat with respect to horizontal.

4. The device of claim 1 wherein the platform has opposite lateral edges; each side panel in its upright position, has an inner side meeting a respective one of the lateral edges adjacent a pivot line of said inner side, an upper portion disposed above the pivot line and platform to partially form the pet enclosure, and a lower portion disposed below the pivot line and platform to form a base leg.

5. The device of claim 4 wherein each side panel, in its generally horizontal position, has its upper portion extending laterally outwardly away from the platform and its lower portion generally underlying the platform and engaging an undersurface of the platform to prevent the upper portion from pivoting to a downwardly depending position.

6. The device of claim 5 wherein the upper portion of each side panel, in its upright position, is substantially greater in vertical extent than the respective lower portion.

7. The device of claim 5 wherein the front and rear panels, in their upright positions, have upper edges, and in their generally horizontal positions, overlie the platform with the upper edges disposed adjacent each other.

8. The device of claim 7 further comprising second retaining means for releasably retaining the front and rear panels in their horizontal positions.

9. The device of claim 8 wherein the upper edges of the front and rear panels face each other in their generally horizontal positions, and the second retaining means comprises a second connector for connecting the front and rear panels to each other.

10. The device of claim 8 wherein the platform and one of the front or rear panels have hand grip holes which are in register when said one panel is its generally horizontal position.

11. The device of claim 10 wherein said hand grip hole is in the front panel, and the front panel is so pivotally connected to a front edge of the platform adjacent a lower edge of the front panel.

12. The device of claim 11 wherein the rear panel in its upright position has an inner side meeting a rear edge of the platform along a pivot line of a said inner side, an upper portion disposed above the pivot line and platform to partially form the pet enclosure, and a lower portion disposed below the pivot line and platform, and aligned with the lower portions of the side panels, to form a further base leg.

13. The device of claim 4 further comprising two support members, each carried on a respective one of the side panels, and each having a lower support surface and being adjustably mounted on the respective side panel to vary the angle between its support surface and the platform to approximate the angle of such passenger seat with respect to horizontal.

14. The device of claim 13 wherein each of the support members comprises a wing panel carried on an outer side of the respective side panel and generally parallel thereto, the support surface being a lower edge of the wing panel, a forward end of the wing panel being pivotally connected to the side panel, and a rear end of the wing panel being selectively attachable to the side panel in different angular positions about the pivotal connection.

15. The device of claim 4 wherein the rear panel and the side panels have indexing surfaces, abutting when the panels are in their upright positions, to set the rear panel at such upward and rearward inclination.

16. The device of claim 15 wherein the indexing surfaces of the side panels comprise angular rear edges thereof, and the indexing surface of the rear panel comprises a broad inner face thereof.

17. The device of claim 1 wherein at least an upper surface of the platform and at least inner surfaces of the panels which form the pet enclosure are covered with indoor/outdoor carpeting.

18. A pet carrier for use in a vehicle, comprising:
a generally horizontal platform having a front edge, a rear edge, and opposite lateral edges;
a rear panel pivotally connected to the platform adjacent the rear edge thereof for movement between a generally upright position, in which a free edge thereof is disposed uppermost, and a generally horizontal position overlying the platform, and sized so that, in said generally horizontal position, the free edge lies inwardly of the front edge of the platform;
a front panel pivotally connected to the platform adjacent the front edge thereof for movement between a generally upright position in which a free edge thereof is disposed uppermost, and a generally horizontal position overlying the platform with the free edge of the front panel adjacent the free edge of the rear panel in its horizontal position;

two side panels, each pivotally connected to the platform adjacent a respective one of its lateral edges for movement between a generally upright position in which a free edge thereof is disposed uppermost, and a generally horizontal position in which the free edge projects laterally outwardly away from the platform;

the panels, in their upright positions, having peripheral portions which lie adjacent one another so that the upright panels form a pet enclosure;

first retaining means associated with the panels for releasably retaining the panels in their upright positions; and second retaining means associated with the front and rear panels for selectively retaining the front and rear panels in their generally horizontal positions.

19. The device of claim 18 wherein the platform and one of said front or rear panels have hand grip holes which are in register when said one panel is in its generally horizontal position.

20. The device of claim 18 wherein each of said side panels, in its upright position, has an inner side meeting a respective one of the lateral edges of the platform adjacent a pivot line of said inner side, an upper portion extending from said pivot line to said uppermost free edge, and a lower portion extending downwardly from said pivot line, by a lesser vertical extent than said upper portion, to form a base leg, the lower portion, in the generally horizontal position generally underlying the platform and engaging an undersurface of the platform to prevent the upper portion from pivoting to a downwardly depending position.

21. The device of claim 20 further comprising a respective support panel carried on the outer side of each side panel and generally parallel thereto, a front end of the support panel being pivotally connected to the side panel, and a rear end of the support panel being selectively attachable to the side panel in various angular positions about the pivotal connection, whereby a lower edge of the support panel may be caused to protrude beyond the lower portion of the side panel at various angles.

22. A pet carrier for use in a vehicle, comprising:
a platform;
a pet enclosure (upstanding) extending upwardly from said platform; and
at least one support interconnected with the platform, extending in a front to rear direction, and having a lower support surface adapted to rest on a passenger seat of such vehicle, one end of the support being pivotable with respect to the platform, and the other end of the support being selectively vertically displaceable with respect to the platform by pivotal movement of the one end, whereby the support is adjustable to vary the angle between the support surface and the platform to approximate an angle of such passenger seat with respect to horizontal.

23. The device of claim 22 wherein the enclosure includes opposite side panels, and wherein there are two such supports, each mounted on a respective one of the side panels, said one end being a front end pivotably connected to the respective side panel, and said other end being a rear end selectively attachable to the respective side panel in different angular positions about the pivotal connection, whereby the angle of the support surface can be so adjusted.

* * * * *